3,551,186
FINISHING GLASS-FIBERS
Karl Martin, Frankenthal, Pfalz, and Wolfgang Stabel, Friedelsheim, Pfalz, Germany, assignors to Badische Anilin- & Soda-Fabrik Aktiengesellschaft, Ludwigshafen (Rhine), Germany
No Drawing. Filed Mar. 21, 1967, Ser. No. 624,700
Claims priority, application Germany, Mar. 23, 1966, 1,494,861; Jan. 12, 1967, 1,669,577
Int. Cl. B32b *17/04;* B44d *1/44;* C03c *25/02*
U.S. Cl. 117—65.2         11 Claims

ABSTRACT OF THE DISCLOSURE

A method of finishing glass fibers and shaped structures thereof by impregnating them with aqueous liquors which contain film-forming high molecular weight substances and, if desired, pigments, and additionally with aqueous hydrofluoric acid, drying them at a temperature of at least 50° C. and, if desired, mechanically pressing or bending them. The method gives improved anti-slip properties, colorations and delustering effects on glass fibers and shaped structures thereof, e.g. woven and non-woven fabrics.

---

It is known that glass fibers and shaped articles prepared therefrom, e.g. woven and non-woven fabrics, may be impregnated with aqueous liquors which contain film-forming high molecular weight substances, the impregnated material being dried. The liquors may contain additives, e.g. softeners, wetting agents, thickeners and particularly white or colored pigments. The treatments may serve a variety of purposes, for example to modify the handle, to improve the anti-slip properties and other mechanical characteristics and to color the material. Glass fibers and shaped structures prepared therefrom exhibit a strong luster which is often undesirable. Attempts have been made to reduce the luster by treating the material with film-forming high molecular weight substances and white pigments. The success of such a treatment is however relatively slight and is moreover achieved at the expense of abrasion resistance, which suffers considerably. As glass fibers by their very nature have low abrasion resistance and therefore very limited usefulness, delustering cannot be carried out in the said manner if practically useful results are to be obtained. Moreover, it has been found that many film-forming high molecular weight substances have only moderate adhesion to glass fibers, which is only slightly improved by adhesion promoters, e.g. aminosilanes.

It is an object of the present invention to deluster glass fibers or shaped structures thereof more efficiently than has hitherto been possible.

Another object is to avoid the loss of abrasion resistance which has hitherto occured in the delustering of glass fibers and shaped structures thereof.

A further object is to finish glass fibers and shaped structures thereof so that they have a higher abrasion resistance than in the unfinished condition.

A still further object is to produce finishing effects on glass fibers and shaped structures thereof which have higher resistance to washing than those hitherto obtainable.

Yet another object is to produce pigment colorations on glass fibers and shaped structures thereof which exhibit improved resistance to washing.

Still another object is to impart to uncolored glass fibers and shaped structures prepared therefrom a degree of whiteness which has not hitherto been obtainable.

These and other objects are achieved by the present invention.

We have found that glass fibers and shaped structures thereof can be finished much more satisfactorily than hitherto by impregnating them with an aqueous liquor which contains at least one film-forming high molecular weight substance and, if desired, one or more finely divided pigments and/or conventional additives, drying the impregnated material, impregnating it with aqueous hydrofluoric acid before, during or after this treatment and drying it at a temperature of at least 50° C.

In general, those embodiments of the present process are preferred in which the treatment with hydrofluoric acid is carried out during or before the impregnation with film-forming high molecular weight substances, the adherence of the film-forming substances to the glass fibers thereby being particularly improved. It is especially advantageous to carry out the treatment with hydrofluoric acid in the presence of the film-forming substance. The easiest method to achieve this is to impregnate the material to be treated with an aqueous bath containing the hydrofluoric acid, one or more film-forming high molecular weight substances and, if desired, pigments and/or other additives. An alternative procedure which offers additional advantages in that, among other things, it produces a particularly pleasant handle, is to impregnate the glass fibers or shaped structures thereof, before treating them with an aqueous liquor containing at least one film-forming high molecular weight substance, if desired one or more finely divided pigments and/or conventional additives, but no hydrofluoric acid, with an aqueous liquor which contains hydrofluoric acid in addition to at least one film-forming high molecular weight substance, the material then being dried at a temperature of at least 50° C.

Both the pretreatment liquor and the liquor which is free from hydrofluoric acid may contain additives conventionally used in glass fiber finishing, e.g. softeners or agents that modify the handle, such as fatty acid esters of hydroxyalkylamines and their quaternization products, wetting agents such as alkylaryl sulfonates and ethenoxylation products of fatty alcohols, fatty amines, alkylphenols and fatty amides, thickeners, such as carboxymethylcellulose and alginates, and adhesion promotors, such as aminosilanes.

The amount of hydrofluoric acid applied to the material may be varied within very wide limits, for example between 0.01 and 3%, calculated as anhydrous pure substance and based on the weight of the fibrous material. It is preferred to use an amount of hydrofluoric acid between 0.01 and 1%, percentages as defined above.

As film-forming high molecular weight substances it is possible to use any materials which come under this definition. Those of the said materials which are insoluble in water are of particular importance industrially. These are used in the form of their aqueous dispersions.

Homopolymers and copolymers of monomers which contain vinyl and/or acrylyl groups are preferred owing to their ready availability. Examples are those of vinyl esters of carboxylic acids, e.g. vinyl propionate, esters of acrylic and methacrylic acids, e.g. methyl, ethyl or butyl acrylate or butyl methacrylate, acrylamide, methacrylamide, vinyl chloride, vinylidene chloride, styrene, acrylonitrile, butadiene and isoprene. Other monomers suitable as copolymer components are those which are capable of crosslinking the polymers during their manufacture or application or of causing them to react with the material to be treated and/or any additives during their manufacture or application or of causing them to react with the material to be treated and/or any additives during their application, e.g. monomers which contain two reactive vinyl or acrylyl groups, such as butanediol diacrylate, or monomers which contain another type of reactive group in addition to a vinyl or acrylyl group. Monomers of the latter type include N-methylol compounds of acrylamide and methacrylamide as well as ethers thereof with low molecular weight alcohols, and particularly monomers which bear hydrocarbon radicals to which a hydroxyl group and a halogen atom are attached on two vicinal carbon atoms. Examples of substances of this type are compounds containing chlorohydrin groups and having at least one polymerizable double bond, in particular esters of α,β-unsaturated organic acids, such as acrylic acid or methacrylic acid, with polyhydric alcohols having a chlorine atom in the α-position to a free hydroxyl group, e.g. 3-chloropropanediol-(1,2), 2,3-dichlorobutanediol-(1,4), 3-chlorobutanetriol-(1,2,4), 1,4-dichlorobutanediol-(2,3), 3-chloro-2-methyl-propanediol-(1,2) or 3-chloro - 2 - chloromethylpropanediol - (1,2). 2 - hydroxy - 3 - chloropropyl acrylate is particularly readily available and therefore of special industrial interest as a comonomer. Polyvinyl esters, such as polyvinyl propionate, copolymers of butadiene and styrene, and copolymers of at least one alkyl ester of acrylic acid with up to four carbon atoms in the alkyl group and at least one of the monomers acrylonitrile, acrylamide, vinyl chloride, butanediol diacrylate, N-methylolmethacrylamide and 2 - hydroxy-3-chloropropyl acrylate are particularly important as film-forming high molecular weight substances. Optimum results may be achieved by using copolymers which as the main component contain copolymerized units of n-butyl acrylate in addition to minor amounts of copolymerized acrylonitrile and 2-hydroxy-3-chloropropyl acrylate units.

The polymers may be prepared in conventional manner. If the polymers used are insoluble in water, they may for example be prepared by emulsion polymerization, aqueous formulations of the polymers being obtained which may be used direct. The film-forming high molecular weight substances are applied to the glass fibers or shaped structures thereof in the usual amounts. Amounts of, for example, 0.05 to 10%, preferably 0.5 to 5%, calculated as pure anhydrous high molecular weight substance and based on the weight of the fibrous material to be treated have proved useful. If, as explained above, the treatment is carried out in more than one bath, the said percentages refer to the total amount of film-forming high molecular weight substance. Apart from the film-forming high molecular weight substance the finishing liquors may contain conventional additives, especially finely divided pigments of any kind and/or other additives, such as softeners, agents, modifying the handle, wetting agents, thickeners and adhesion promoters.

The addition of these conventional finishing agents to the bath containing the hydrofluoric acid obviously presupposes that the agents are compatible with the acid. If this is not the case, which can be determined by simple preliminary experiments, the two treatments must be carried out in separate baths.

After the fibrous material to be finished has been impregnated with the aqueous hydrofluoric acid it is advantageously squeezed in order to ensure uniform wet pickup and thus the application of a definite amount of chemical. A wet pickup of 25 to 50% has proved advantageous. For impregnation and squeezing it is advisable to use a padding mangle.

The material is dried at a temperature of at least 50° C. Although the beneficial effect is achieved to a certain extent even at drying temperatures below 50° C., the results deteriorate rapidly as the temperature is lowered. To ensure consistently good results it is therefore inadvisable to apply a temperature below the said lower limit. It is not possible to give an exact upper limit for the drying temperature. Above approx. 100° C. at normal pressure the effect obtainable becomes gradually less as the ambient temperature is increased, it is however still possible to raise the ambient temperature up to just below the decomposition temperature of the substances applied to the fibrous material or, if aqueous hydrofluoric acid has been applied on its own, up to the maximum temperature to which the glass fibers will stand up, superatmospheric pressure being used if desired. Optimum results are achieved by carrying out the drying at an ambient temperature of 80 to 90° C. or, if reactive high molecular weight substances, applied simultaneously, are to be reacted, for example those containing N-methylol methacrylamide or 2-hydroxy - 3 - chloropropyl acrylate units, at up to 160° C. Hot air chambers or hot flues may for example be used for drying.

If the conventional treatment of the material with film-forming high-molecular weight substances and, if desired, pigments and other auxiliaries is to be carried out in a separate step, the conventional conditions specified for the particular systems are used.

The process according to this invention enables glass fibers and shaped structures thereof to be delustered much more efficiently than has hitherto been possible. The abrasion resistance of the glass fibers is not reduced but, on the contrary, considerably increased. Moreover, the process of the invention improves the fastness to washing of effects produced by impregnation with film-forming high molecular weight substances, e.g. the fastness to washing of pigment colorations. The new process may furthermore be used to impart the uncolored glass fibers a degree of whiteness which has not hitherto been obtainable.

Apart from the said properties, which represent an advance in the art, the fibrous material treated according to this invention can be imparted a particularly soft handle by mechanically pressing or bending it after drying.

The mechanical pressing or bending may be carried out using any of the various types of commercially available equipment. For example, calenders have proved useful in which some of the rollers are provided with an elastic wrapping of paper or pressed cotton material. Padding machines may also be used for pressing, while beetles are suitable for bending. Treatment on a calender is usually preferred. Consistent results are obtained with a calender in a simple manner especially when finishing glass fiber articles of flat shape, e.g. woven or non-woven fabrics. The calender pressure has a certain influence on the result of the treatment. Calenders of the usual size are normally set at a lineal pressure of 10 to 60 kg./cm., preferably 10 to 50 kg./cm.

The mechanical pressing or bending is usually carried out at normal temperature. Although elevated temperatures of, for example up to 230° C. may be used, these do not usually offer any special advantages.

The mechanical treatment does not impair the abrasion resistance of glass fibers finished according to this invention. This is surprising because glass fibers that have not been pretreated or that have been delustered or colored conventionally are destroyed when subjected to a similar mechanical treatment.

The invention is further illustrated by the following examples in which the parts and percentages are by weight.

EXAMPLE 1

A glass fabric weighing 180 g./m.² was padded with a liquor of the following composition:

100 g./l. of a 40% aqueous dispersion of a copolymer of 90 parts n-butyl acrylate,
7 parts acrylonitrile and
3 parts 3-chloro-2-hydroxypropyl acrylate, and
20 g./l. hydrofluoric acid, the balance being water The impregnated material was squeezed to a wet pickup of 30% and dried at 80° C.

After this treatment the high gloss had disappeared and the material exhibited a very considerable delustering effect and substantially improved abrasion resistance.

A pleasant, soft handle could be imparted to the fabric by adding to the impregnating liquor 40 g./l. of a 30% aqueous paste of a mixture, quaternized with dimethyl sulfate, of esters of triethanolamine with stearic acid and otherwise following the procedure described.

The fabric could be colored a level brownish beige shade by additionally adding 6 g./l. of a yellow iron oxide pigment and 3 g./l. of a mixture of a red iron oxide pigment and gas black, the other properties being unaffected.

EXAMPLE 2

A glass fabric weighing 180 g./m.$^2$ was padded with a liquor of the following composition:

20 g./l. of the copolymer dispersion specified in Example 1 (component A),
20 g./l. of the paste, specified in Example 1, of quaternized esters of triethanolamine with stearic acid (component B),
20 g./l. hydrofluoric acid 32%, the balance being water.

The fabric was squeezed to a wet pickup of 30%, dried acid diethylaminde → 2,3-hydroxynaphthoic acid-2', 4'-dimethoxy-5-chloroanilide
Pigment D=α-ferric oxide
Poylmer E=40% aqueous dispersion of the copolymer specified in Example 1
Polymer F=50% aqueous dispersion of polyvinyl propionate containing 2% of dissolved copolymer of methacrylamide and vinylpyrrolidone
Polymer G=50% aqueous dispersion of a copolymer of 60 parts butadiene and 40 parts styrene
Polymer H=50% aqueous dispersion of a copolymer of 58.2 parts vinyl chloride, 40.6 parts butyl acrylate and 1.2 parts acrylamide
Polymer I=40% aqueous dispersion of a copolymer of 89 parts n-butyl acrylate, 5 parts butanediol diacrylate, 3 parts N-methylol methacrylamide and 3 parts acrylamide
Polymer K=Mixture of 65% of a 50% aqueous dispersion of a copolymer of 40 parts vinyl chloride, 51 parts butyl acrylate, 6.8 parts methyl acrylate and 2.3 parts acrylamide, 0.05% carboxymethylcellulose, 0.8% of the tetrasodium salt of ethylene diamine tetracetic acid, 6.8% diammonium phosphate and 0.5% sodium alginate, with the balance water.

| | a | b | c | d | e | f | g | h | i | k | l | m | n | o | p |
|---|---|---|---|---|---|---|---|---|---|---|---|---|---|---|---|
| Pigment A | | | | 20 | 20 | | | | | | | 20 | 20 | 20 | 20 |
| Pigment B | | | | | | 20 | 20 | | | | | | | | |
| Pigment C | | | | | | | | 20 | 20 | | | | | | |
| Pigment D | | | | | | | | | | 20 | 20 | | | | |
| Polymer E | | | 100 | 100 | 100 | 100 | | | | | | | | | |
| Polymer F | | | | | | | 100 | 100 | | | | | | | |
| Polymer G | | | | | | | | | 100 | 100 | | | | | |
| Polymer H | | | | | | | | | | | 100 | 100 | | | |
| Polymer I | | | | | | | | | | | | | 100 | 100 | |
| Polymer K | | | | | | | | | | | | | | | 100 | 100 |
| Hydrofluoric acid 32% | | | | 50 | | 50 | | 50 | | 50 | | 50 | | 50 | | 50 |
| Abrasion resistance | 5 | 9 | 35 | 10 | 40 | 8 | 30 | 8 | 20 | 8 | 30 | 9 | 30 | 7 | 30 |
| Fastness to washing according to DIN 54010 | | 2-3 | 4-5 | 1 | 3 | 2 | 2-3 | 2 | 3 | 2 | 3-4 | 2 | 3-4 | | | at 80° C. and then padded with another aqueous liquor containing 80 g./l. component A and
20 g./l. component B.

It was again squeezed to a wet pickup of 30%, dried at 90° C. and heated for 30 seconds at 150° C.

The fabric thus treated was similarly delustered and abrasion-resistant to that treated according to Example 1, but had an even softer handle.

The fabric could be colored a brownish beige shade, while preserving its other properties, by adding 6 g./l. of yellow iron oxide pigment and 3 g./l. of a mixture of a red iron oxide pigment and gas black to the second liquor.

EXAMPLE 3

Comparative experiments were carried out in which specimens of glass fabric weighing 180 g./m.$^2$ were impregnated on a padding machine with liquors ($b$) to ($p$), squeezed to a wet pickup of 30% and dried at 80° C. The abrasion resistance of the specimens and, in the case of colored material, the fastness of the colorations to washing were determined.

The abrasion resistance was determined as follows: The fabric was folded and the surfaces in contact with each other moved relatively to each other at a constant pressure of 500 g./cm.$^2$ with the fold moving. The number of cycles required to rupture the specimen was given as a measure to the abrasion resistance.

The fastness to washing was determined according to DIN 54010 (German Industrial Standards).

The sample designated ($a$) was untreated.

The other designations used in the table have the following meanings.

Pigment A=copper phthalocyanine (α modification)
Pigment B=completely chlorinated copper phthalocyanine
Pigment C=azo pigment of 2-amino-anisol-4-sulfonic The table shows that treatment with film-forming high molecular weight substances, either alone or together with dye-pigments, gives only a minor improvement of the abrasion resistance of the fabric. There is no delustering effect. On the other hand, the specimens additionally treated with hydrofluoric acid were considerably delustered and had considerably improved abrasion resistance. In the colored specimens the use of hydrofluoric acid moreover improved the washfastness of pigment colorations.

EXAMPLE 4

A glass fabric is padded with an aqueous liquor containing:

50 g./l. hydrofluoric acid 32%,
50 g./l. of the copolymer dispersion specified in Example 1,
20 g./l. C.I. Pigment Blue 15 and
2 g./l. N-β-aminoethyl-γ-aminopropyl-trimethoxysilane.

The impregnated material is squeezed to a wet pickup of 30% dried at 80° C. and heated for 2 minutes at 150° C. After cooling, the fabric is passed at 20° C. through a steel-paper calender (roller dia. 40 cm., roller length 200 cm.) at a lineal pressure of 40 kg./cm.

A soft fabric is obtained which exhibits very good abrasion resistance and whose coloration has good fastness to washing.

EXAMPLE 5

A glass fabric is padded with an aqueous liquor containing:

100 g./l. hydrofluoric acid 32%
50 g./l. of the copolymer dispersion specified in Example 1
50 g./l. of a 30% aqueous paste of a mixture, quaternized with dimethyl sulfate, of esters of triethanolamine with stearic acid.

The fabric is squeezed to a wet pickup of 30%, dried at 80° C., heated for 90 seconds at 150° C. and then passed at 20° C. through a steel-cotton calender (roller dia. 40 cm., roller length 200 cm.) at a lineal pressure of 60 kg./cm.

A very soft, strongly delustered fabric is obtained exhibiting very good resistance to abrasion.

EXAMPLE 6

A glass fabric is padded with an aqueous bath containing 50 g./l. hydrofluoric acid 32%,
50 g./l. of the copolymer dispersion specified in Example 1,
20 g./l. C.I. Pigment Blue 15 and
2 g./l. N-β-aminoethyl-γ-aminopropyl-trimethoxysilane.

The fabric is squeezed to a wet pickup of 50%, dried at 100° C. and heated for 90 seconds at 150° C. After cooling, the fabric is passed through a beetle having 15 fallers (approx. 600 r.p.m.).

A soft fabric is obtained which exhibits very good abrasion resistance and whose coloration has good fastness to washing.

We claim:
1. A process of finishing glass fibers and shaped structures thereof which comprises: impregnating said fibers with an aqueous liquor containing
   (a) in aqueous dispersion, a film-forming copolymer of at least one alkyl ester of acrylic acid having up to four carbon atoms in the alkyl group and at least one monomer selected from the class consisting of acrylonitrile, acrylamide, vinyl chloride, butanediol, diacrylate, N-methylol methacrylamide and 3-chloro-2-hydroxypropyl acrylate, and
   (b) hydrofluoric acid;
and drying the impregnated fibers at a temperature of at least about 50° C.

2. A process as claimed in claim 1 wherein the impregnated and dried glass fibers are further treated with an aqueous dispersion of said film-forming copolymer free of the hydrofluoric acid and again dried to provide a second finish.

3. A process as claimed in claim 1 wherein the hydrofluoric acid is applied to the fibers in an amount of about 0.01 to 3% by weight, calculated as the pure anhydrous acid and based on the weight of the dry fibers.

4. A process as claimed in claim 1 wherein the hydrofluoric acid is applied to the fibers in an amount of about 0.1 to 1% by weight, calculated as the pure anhydrous acid and based on the weight of the dry fibers.

5. A process as claimed in claim 1 wherein said film-forming copolymer is applied to the fibers in a total amount of about 0.05 to 10% by weight, calculated as the pure anhydrous substance and based on the weight of the dry fibers.

6. A process as claimed in claim 1 wherein said film-forming copolymer is applied to the fibers in a total amount of about 0.5 to 5% by weight, calculated as the pure anhydrous substance and based on the weight of the dry fibers.

7. A process as claimed in claim 1 wherein said drying is carried out at a temperature of about 80° C. to 160° C.

8. A process as claimed in claim 1 wherein the impregnated and dried fibers are subjected to mechanical pressing or bending sufficient to improve the soft handle thereof.

9. A process as claimed in claim 1 wherein the impregnated and dried fibers are calendered at a lineal pressure of about 10 to 60 kg./cm.

10. A process as claimed in claim 1 wherein said aqueous liquor also contains at least one finely divided pigment.

11. A process as claimed in claim 1 wherein said aqueous contains at least one additional additive of softeners, agents modifying the handle, wetting agents, thickeners or adhesion promoters.

References Cited

UNITED STATES PATENTS

| | | | |
|---|---|---|---|
| 2,204,859 | 6/1940 | Hyatt et al. | 117—54X |
| 2,261,148 | 11/1941 | Ebaugh et al. | 117—54X |
| 2,798,020 | 7/1957 | Balz et al. | 117—54X |

WILLIAM D. MARTIN, Primary Examiner

D. COHEN, Assistant Examiner

U.S. Cl. X.R.
117—76, 126

PO-1050
(5/69)

UNITED STATES PATENT OFFICE
CERTIFICATE OF CORRECTION

Patent No. 3,551,186      Dated December 29, 1970

Inventor(s) Karl Martin et al

It is certified that error appears in the above-identified patent and that said Letters Patent are hereby corrected as shown below:

Column 7, line 30, "butanediol," should read -- butanediol --.

Signed and sealed this 4th day of May 1971.

(SEAL)
Attest:

EDWARD M. FLETCHER, JR.          WILLIAM E. SCHUYLER, JR
Attesting Officer                Commissioner of Patents